(12) United States Patent
Phegade et al.

(10) Patent No.: US 9,306,934 B2
(45) Date of Patent: Apr. 5, 2016

(54) TRUSTED SERVICE INTERACTION

(75) Inventors: Vinay Phegade, Beaverton, OR (US); Conor Cahill, Waterford, VA (US); Sanjay Bakshi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,427

(22) PCT Filed: Apr. 17, 2012

(86) PCT No.: PCT/US2012/033907
§ 371 (c)(1),
(2), (4) Date: Jul. 29, 2014

(87) PCT Pub. No.: WO2013/158075
PCT Pub. Date: Oct. 24, 2013

(65) Prior Publication Data
US 2014/0337960 A1    Nov. 13, 2014

(51) Int. Cl.
*G06F 7/04*  (2006.01)
*H04L 29/06*  (2006.01)
(Continued)

(52) U.S. Cl.
CPC .......... *H04L 63/0823* (2013.01); *G06F 3/0481* (2013.01); *G06F 21/33* (2013.01); *G06F 21/42* (2013.01); *G06F 21/84* (2013.01); *G06Q 20/382* (2013.01); *G06Q 20/401* (2013.01);
(Continued)

(58) Field of Classification Search
CPC ..... H04L 63/0823; H04L 63/08; H04L 67/14; G06F 3/0481; G06F 21/42; G06Q 20/382; G06Q 20/401

USPC ...................... 726/10, 1, 22, 25, 26; 713/155
See application file for complete search history.

(56) References Cited

U.S. PATENT DOCUMENTS 5,572,647 A  *  11/1996  Blades .................. G06F 3/0481
                                              715/798
6,088,451 A      7/2000  He et al.
(Continued)

FOREIGN PATENT DOCUMENTS

CN          104205144 A        12/2014
EP              2839422         2/2015
(Continued)

OTHER PUBLICATIONS

International Search Report and Written Opinion received for PCT Application No. PCT/US2012/033907, mailed on Jan. 3, 2013, 10 pages.
(Continued)

*Primary Examiner* — Abu Sholeman
(74) *Attorney, Agent, or Firm* — Alpine Technology Law Group LLC

(57) ABSTRACT

In one embodiment a controller comprises logic configured to receive, from an application executing on an untrusted execution complex of the electronic device, a request for a secure communication session with a remote service, verify a security credential received from the remote service, establish a secure communication connection between the secure controller and the remote service, establish a secure user interface, collect one or more authentication credentials from a user via the secure user interface, forward the one or more authentication credentials to the remote service, and conduct a secure communication session with the remote service. Other embodiments may be described.

18 Claims, 4 Drawing Sheets

(51) Int. Cl.

| | |
|---|---|
| *G06Q 20/38* | (2012.01) |
| *G06Q 20/40* | (2012.01) |
| *G06F 21/42* | (2013.01) |
| *G06F 3/0481* | (2013.01) |
| *G06F 21/84* | (2013.01) |
| *G06F 21/33* | (2013.01) |
| *H04L 29/08* | (2006.01) |

(52) U.S. Cl.
CPC ............ *H04L 63/08* (2013.01); *H04L 63/083* (2013.01); *H04L 63/126* (2013.01); *H04L 67/14* (2013.01)

(56) References Cited

U.S. PATENT DOCUMENTS

| | | | | |
|---|---|---|---|---|
| 6,182,225 B1* | 1/2001 | Hagiuda | ............... | G06F 21/31 726/19 |
| 6,301,661 B1* | 10/2001 | Shambroom | ........... | G06F 21/33 713/168 |
| 7,500,262 B1* | 3/2009 | Sanin | ............... | G06F 21/41 705/67 |
| 8,028,329 B2* | 9/2011 | Whitcomb | ............... | G06F 21/33 726/5 |
| 8,200,794 B1* | 6/2012 | Sutherland | ............ | H04L 41/046 709/222 |
| 8,413,210 B2* | 4/2013 | Kuzin | ............... | G06F 21/41 726/2 |
| 8,452,877 B2* | 5/2013 | Zawacki | ............ | H04L 63/0861 709/217 |
| 8,701,029 B2* | 4/2014 | Havivi | ............... | G06F 3/0481 706/10 |
| 8,701,199 B1* | 4/2014 | Dotan | ............... | H04L 63/08 726/25 |
| 2003/0014368 A1* | 1/2003 | Leurig | ............... | G06Q 20/0425 705/64 |
| 2003/0187999 A1 | 10/2003 | Callum | | |
| 2003/0212895 A1* | 11/2003 | Kisliakov | ............ | G06K 19/07 713/185 |
| 2005/0050317 A1 | 3/2005 | Kramer et al. | | |
| 2005/0204160 A1* | 9/2005 | Cook, III | ............ | H04L 63/102 726/5 |
| 2006/0248082 A1* | 11/2006 | Raikar | ............... | H04L 9/32 |
| 2007/0136794 A1* | 6/2007 | Chin | ............... | H04L 63/08 726/5 |
| 2008/0072311 A1* | 3/2008 | Mullick | ............... | H04L 63/0272 726/15 |
| 2008/0263644 A1* | 10/2008 | Grinstein | ............ | G06F 21/445 726/6 |
| 2009/0006848 A1 | 1/2009 | Adrangi et al. | | |
| 2009/0007250 A1* | 1/2009 | Pouzin | ............... | G06F 21/335 726/10 |
| 2009/0119762 A1 | 5/2009 | Thomson et al. | | |
| 2009/0293111 A1* | 11/2009 | Lai | ............... | G06F 21/32 726/6 |
| 2009/0300731 A1* | 12/2009 | Birck | ............... | H04L 63/102 726/5 |
| 2009/0313468 A1* | 12/2009 | Hazlewood | ............ | H04L 63/0823 713/156 |
| 2010/0083347 A1* | 4/2010 | Hinton | ............... | H04L 9/3268 726/1 |
| 2010/0125855 A1* | 5/2010 | Ferwerda | ............... | G06F 9/5027 719/317 |
| 2011/0197267 A1* | 8/2011 | Gravel | ............... | H04L 9/321 726/5 |
| 2011/0202843 A1* | 8/2011 | Morris | ............... | G06F 3/013 715/716 |
| 2011/0271331 A1 | 11/2011 | Adams | | |
| 2012/0089481 A1 | 4/2012 | Iozzia et al. | | |
| 2012/0110318 A1* | 5/2012 | Stone | ............... | H04L 9/3234 713/150 |
| 2012/0297187 A1* | 11/2012 | Paya | ............... | H04L 63/0492 713/156 |
| 2013/0081133 A1* | 3/2013 | Hetroy | ............... | G06F 21/36 726/16 |
| 2013/0159021 A1* | 6/2013 | Felsher | ............... | G06F 19/322 705/3 |
| 2013/0254842 A1* | 9/2013 | Jang | ............... | H04L 63/0884 726/3 |
| 2013/0326380 A1* | 12/2013 | Lai | ............... | G06F 3/0481 715/765 |
| 2014/0123257 A1* | 5/2014 | Gordon | ............... | H04L 67/1095 726/7 |
| 2014/0181922 A1* | 6/2014 | Jakobsson | ............ | G06F 21/46 726/5 |

FOREIGN PATENT DOCUMENTS

| | | |
|---|---|---|
| JP | 2003-510713 A | 3/2003 |
| JP | 2015-520439 A | 7/2015 |
| KR | 0783208 B1 | 12/2007 |
| KR | 20090047041 A | 5/2009 |
| KR | 10-2014-0127906 A | 11/2014 |
| WO | 2011091313 A1 | 7/2011 |
| WO | 2013/158075 A1 | 10/2013 |

OTHER PUBLICATIONS

International Preliminary Report on Patentability received for International Application No. PCT/US2012/033907, mailed on Oct. 30, 2014.
Office Action received for Korean Patent Application No. 2014-7026849, mailed on Oct. 19, 2015, 10 pages including 4 pages of English translation.
Extended European Search Report received for European Patent Application No. 12874582.5, mailed on Nov. 13, 2015, 9 pages.
Li, Chunxiao, et al. "A Secure User Interface for Web Applications Running Under an Untrusted Operation System", Computer and Information Technology 2010 IEEE 10th International Conference, Jun. 29, 2010, 6 pages, IEEE, Piscataway, NJ.
Tischer, Thomas, et al. "A Pattern for Secure Graphical User Interface Systems", 20th International Workshop on Database and Expert Systems, Aug. 31, 2009, 6 pages, IEEE, Piscataway, NJ.
Office Action received for Japanese Patent Application No. 2015/506945 mailed on Jan. 5, 2016, 6 pages including 3 pages Of English translation.

* cited by examiner

TRUSTED SERVICE INTERACTION

BACKGROUND

The subject matter described herein relates generally to the field of electronic devices and more particularly to a system and method to implement trusted service interaction using electronic devices.

Malicious software (malware) may be used to steal personal information, including payment credentials, for use by unauthorized individuals. By way of example, malware can steal a user's confidential input by spoofing a display or by snooping input into a display module. Once in possession of payment credentials, malware or users thereof, can conduct fraudulent transactions on a user's behalf. This threat has an effect on a percentage of the population who will not conduct online activity due to fear of having their information compromised. This reduces efficiencies that can be gained through online commerce and limits the amount of goods and services purchased by concerned individuals, limiting the growth of online commerce.

Existing solutions to these problems are limited in their usefulness and/or security due to the fact that they are hosted inside an electronic device's operating system, which is always a point of vulnerability, or require external, attached hardware devices, which limit consumer ease-of-use factors. Accordingly systems and techniques to provide a secure computing environment for electronic commerce may find utility.

BRIEF DESCRIPTION OF THE DRAWINGS

The detailed description is described with reference to the accompanying figures.

DETAILED DESCRIPTION

Described herein are exemplary systems and methods to implement trusted service interaction in electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
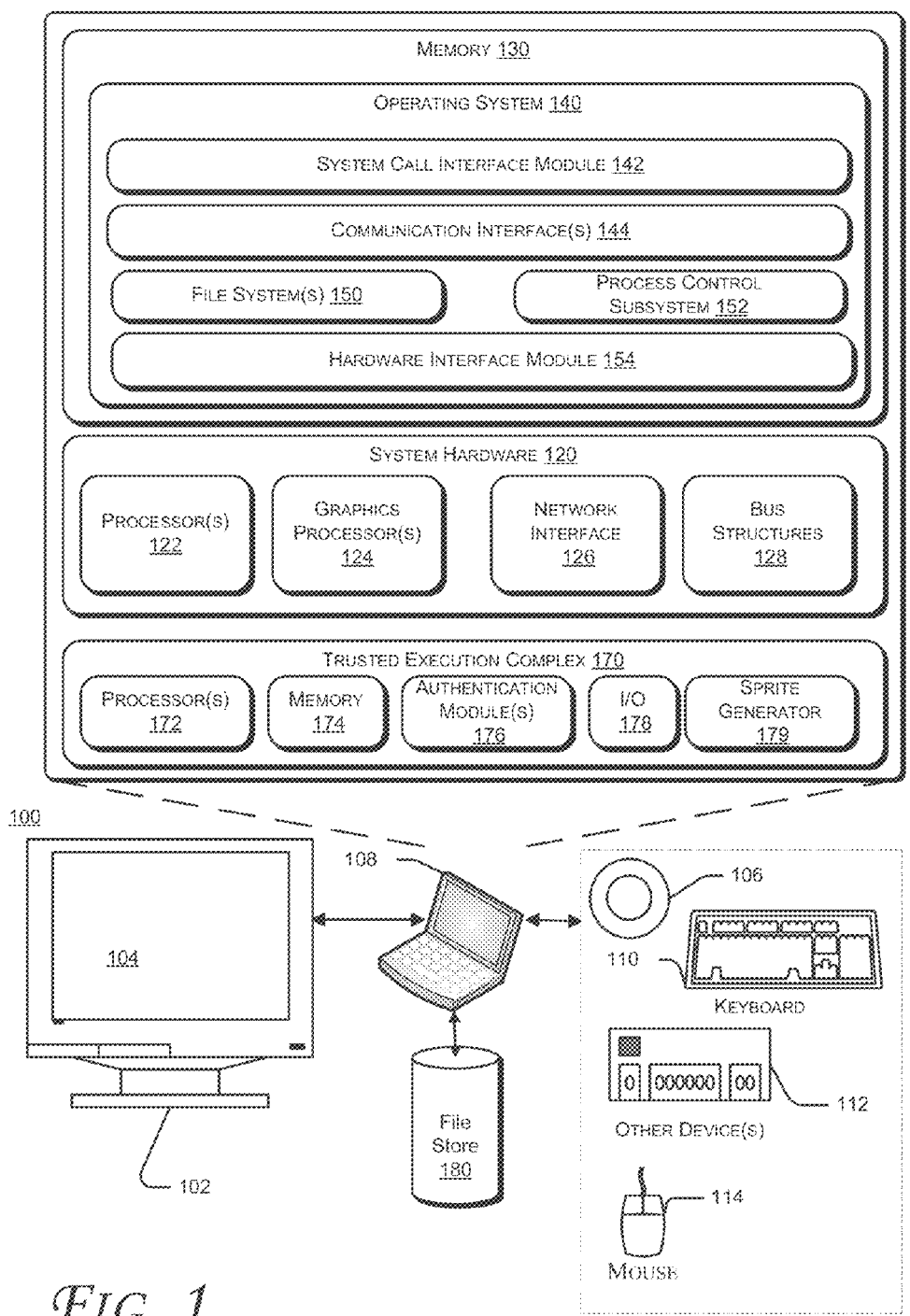
FIG. 1 is a schematic illustration of an exemplary electronic device which may be adapted to include infrastructure for trusted service interaction in accordance with some embodiments.

FIG. 1 is a schematic illustration of an exemplary system 100 which may be adapted to implement trusted service interaction in accordance with some embodiments. In one embodiment, system 100 includes an electronic device 108 and one or more accompanying input/output devices including a display 102 having a screen 104, one or more speakers 106, a keyboard 110, one or more other I/O device(s) 112, and a mouse 114. The other I/O device(s) 112 may include a touch screen, a voice-activated input device, a track ball, a geolocation device, an accelerometer/gyroscope and any other device that allows the system 100 to receive input from a user.

In various embodiments, the electronic device 108 may be embodied as a personal computer, a laptop computer, a personal digital assistant, a mobile telephone, an entertainment device, or another computing device. The electronic device 108 includes system hardware 120 and memory 130, which may be implemented as random access memory and/or read-only memory. A file store 180 may be communicatively coupled to computing device 108. File store 180 may be internal to computing device 108 such as, e.g., one or more hard drives, CD-ROM drives, DVD-ROM drives, or other types of storage devices. File store 180 may also be external to computer 108 such as, e.g., one or more external hard drives, network attached storage, or a separate storage network such as a cloud storage network.

System hardware 120 may include one or more processors 122, graphics processors 124, network interfaces 126, and bus structures 128. In one embodiment, processor 122 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated into the packaging of processor(s) 122, onto the motherboard of computing system 100 or may be coupled via an expansion slot on the motherboard.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN--Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems interface (SCSI), Memory 130 may include an operating system 140 for managing operations of computing device 108. In one embodiment, operating system 140 includes a hardware interface module 154 that provides an interface to system hardware 120. In addition, operating system 140 may include a file system 150 that manages files used in the operation of computing device 108 and a process control subsystem 152 that manages processes executing on computing device 108.

Operating system 140 may include (or manage) one or more communication interfaces that may operate in conjunction with system hardware 120 to transceive data packets and/or data streams from a remote source. Operating system 140 may further include a system call interface module 142 that provides an interface between the operating system 140 and one or more application modules resident in memory 130. Operating system 140 may be embodied as a UNIX operating system or any derivative thereof (e.g., Linux, Solaris, etc.) or as a Windows® brand operating system, or other operating systems.

In some embodiments system 100 may comprise a low-power embedded processor, referred to herein as a trusted execution complex 170. The trusted execution complex 170 may be implemented as an independent integrated circuit located on the motherboard of the system 100. In the embodiment depicted in FIG. 1 the trusted execution complex 170 comprises a processor 172, a memory module 171, an authentication module 176, an I/O module 178, and a secure sprite generator 179. In some embodiments the memory module 164 may comprise a persistent flash memory module and the authentication module 174 may be implemented as logic instructions encoded in the persistent memory module, e.g., firmware or software. The I/O module 178 may comprise a serial I/O module or a parallel I/O module. Because the trusted execution complex 170 is physically separate from the main processor(s) 122 and operating system 140, the trusted execution complex 170 may be made secure, resistant to attack by hackers such that it cannot be tampered with.

Figure 2:
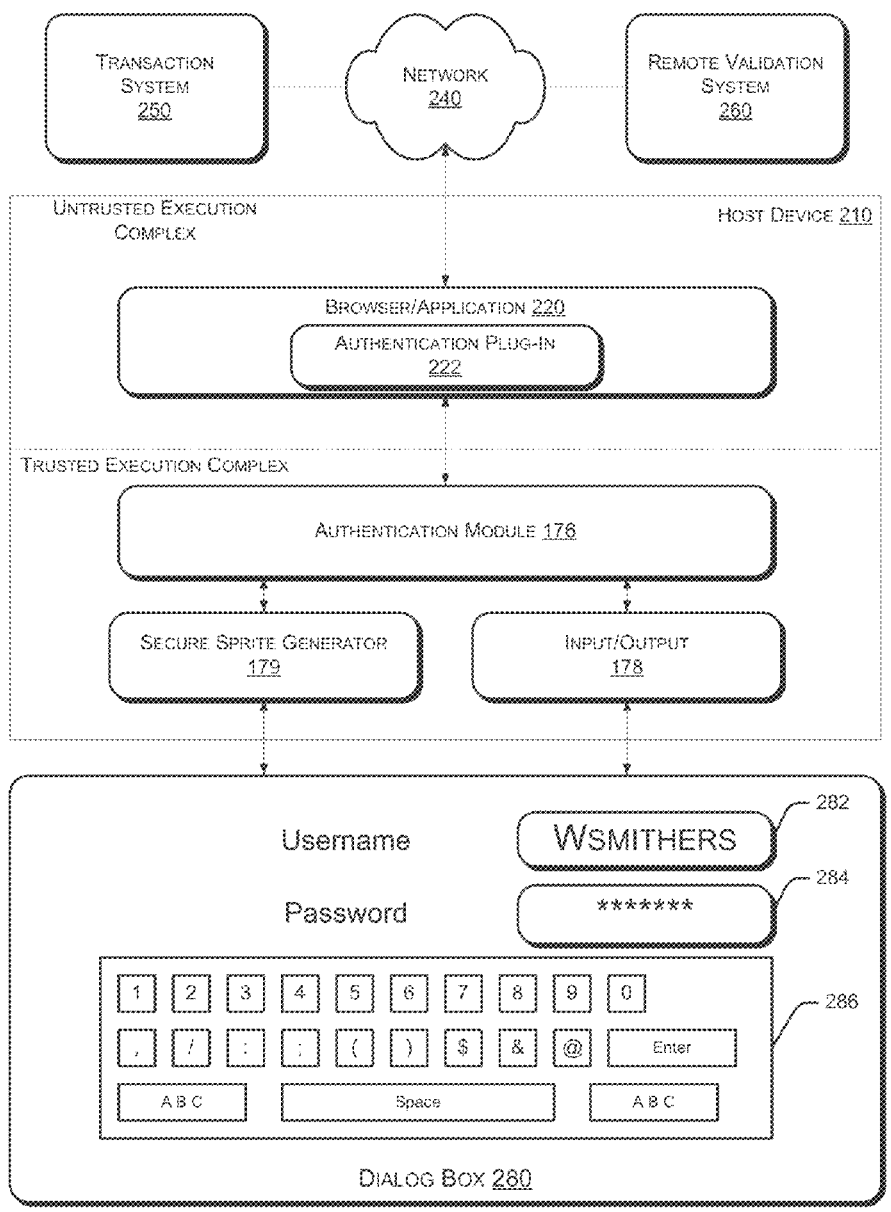
FIG. 2 is a high-level schematic illustration of an exemplary architecture for trusted service interaction in accordance with some embodiments.

In some embodiments the trusted execution complex may be used to ensure trusted service interaction for one or more transactions between a host electronic device and a remote computing device, e.g., a online commerce site or the like. FIG. 2 is a high-level schematic illustration of an exemplary architecture for trusted service interaction accordance with some embodiments. Referring to FIG. 2, a host device 210 may be characterized as having untrusted execution complex and a trusted execution complex. When the host device 210 is embodied as a system 100 the trusted execution complex may be implemented by the trusted execution complex 170, while the untrusted execution complex may be implemented by the main processors(s) 122 and operating system 140 of the system 100. In some embodiments the trusted execution complex may be implemented in a secure portion of the main processor(s) 122.

As illustrated in FIG. 2, remote entities that originate transactions, identified as a transaction system in FIG. 2, may be embodied as electronic commerce websites or the like and may be coupled to the host device via a communication network 240. In use, an owner or operator of electronic device 108 may access the transaction system 250 using a browser 220 or other application software via the network to initiate a secure transaction on the system 250.

The authentication module 176, alone or in combination with an authentication plug-in 222, the input/output module 178 and the secure sprite generator 179 may implement procedures to ensure trusted service interaction via a dialog box 280.

Figure 3:
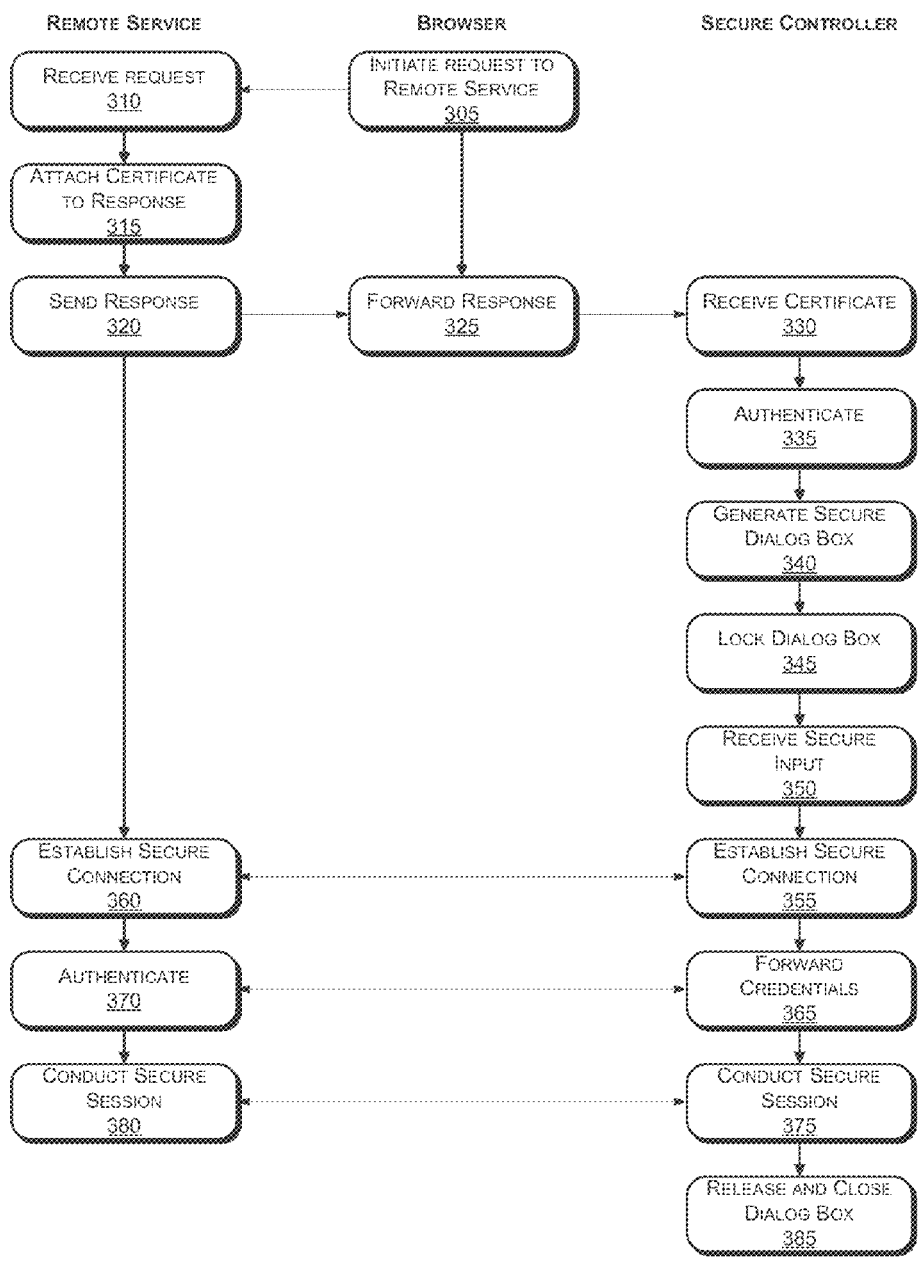
FIG. 3 is a flowchart illustrating operations in a method to implement trusted service interaction in accordance with some embodiments.

Having described various structures of a system to implement trusted service interaction, operating aspects of a system will be explained with reference to FIG. 3. FIG. 3 is a flowchart illustrating operations in a method to implement trusted service interaction in accordance with some embodiments In some embodiments the operations depicted in the flowchart of FIG. 3 may be implemented by the authentication module(s) 176 of the trusted execution complex 170, alone or in combination with other modules.

By way of overview, in some embodiments an electronic device may initiate a service request to a remote service such as an internet commerce service from an application executing in the untrusted execution complex, e.g., a browser. In response to the service request the remote service may provide credentials to the electronic device. In response to receiving the credentials from the remote service the plug-in module 222 may invoke authentication services from the authentication module 176 in the trusted execution complex. In some embodiments the authentication services may implement operations to manage a communication session with the remote service.

Referring to FIG. 3, at operation 305 a browser executing on the electronic device initiates a request to a remote service. Again, by way of example, the remote service may be an e-commerce site or the like, and the request may be a request to access a secure service provided by the site. At operation 310 a request is received at the remote service from a user of the electronic device. In some embodiments the request may include an identifier which uniquely identifies the requesting device and/or application and may also uniquely identify the request. For example, the identifier may include a timestamp which identifies the time at which the request was generated.

In response to the request, at operation 315 the remote service attaches a. certificate, e.g., a private key infrastructure key or the like, to a response to the service request, and at operation 320 the remote service sends the response to the browser that initiated the request. At operation 325 the browser receives the response. The authentication plugin 222 detects that that the response includes a certificate and, in response thereto, initiates a request to the authentication module 176 to initiate and manage a secure communication session with the remote service and forwards the response (operation 320) with the request.

At operation 330 the authentication module 176 in the secure controller receives the request and the associated certificate from the remote service, and at operation 335 the authentication module 176 in the secure controller authenticates the certificate. In some embodiments, the authentication module 176 may authenticate the certificate with a remote validation system 260.

Once the certificate has been validated, at operation 340 the secure sprite generator 179 generates a secure dialog box 280 on a display of the electronic device, At operation 345 the input/output module 178 locks the dialog box 280 such that input/output operations implemented in bitmap of the dialog box 280 are visible only to the trusted execution complex. Once the dialog box 280 is locked input/output operations implemented in the dialog box 280 are not visible to the untrusted execution complex.

Referring briefly to FIG. 2, in some embodiments the dialog box 280 may include a first window 282 for entry of a username and a second window 284 for entry of a password. In addition, the dialog box 280 may include an input mechanism such as a keyboard 286 on the display. A user may enter his or her username and/or password using the keyboard 286.

Referring back to FIG. 3, at operation 350 the authentication module 176 in the secure controller receives the authentication input from the user via the dialog box 280. At operations 355 and 360 a secure communication connection is established between the authentication module 176 of the secure controller and the remote service. In some embodiments establishing the secure connection may involve a handshake procedure to exchange an encryption key. Alternatively a virtual private network (VPN) tunnel may be established between the remote service and the authentication module 176.

At operation 365 the authentication module 176 forwards the credentials (the username and password combination) received via the dialog box 280 to the remote service, which authenticates the credentials at operation 370.

At operations 375 and 380 the secure controller and the remote service conduct a secure communication session. In some embodiments the secure communication session may be conducted via the dialog box 280 generated by the secure sprite generator 179, such that inputs and outputs in the secure communication session are visible only to the trusted execution complex and therefore cannot be snooped by malware or other applications executing in the untrusted execution complex.

When the communication session is finished the authentication module 176 in the secure controller may release and close (operation 385) the dialog box 280, returning control of the display to the untrusted execution complex.

Figure 4:
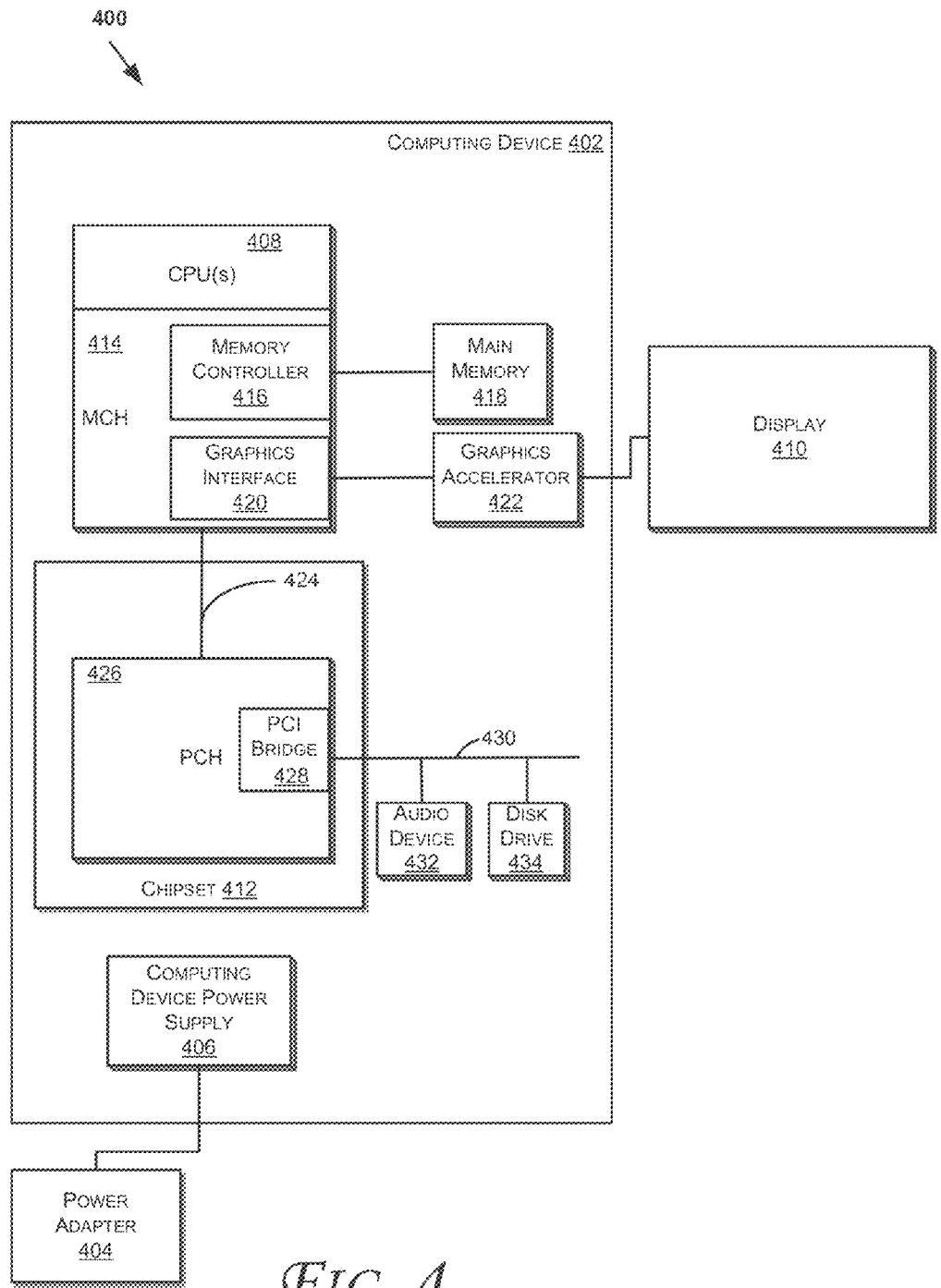
FIG. 4 is a schematic illustration of an electronic device which may be adapted to implement trusted service interaction in accordance with some embodiments.

As described above, in some embodiments the electronic device may be embodied as a computer system. FIG. 4 is a schematic illustration of a computer system 400 in accordance with some embodiments. The computer system 400 includes a computing device 402 and a power adapter 404 (e.g., to supply electrical power to the computing device 402). The computing device 402 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 402 (e.g., through a computing device power supply 406) from one or more of the following sources: one or more battery packs, an alternating current (AC) outlet (e.g., through a transformer and/or adaptor such as a power adapter 404), automotive power supplies, airplane power supplies, and the like. In some embodiments, the power adapter 404 may transform the power supply source output (e.g., the AC outlet voltage of about 110 VAC to 240 VAC) to a direct current (DC) voltage ranging between about 7 VDC to 12.6 VDC. Accordingly, the power adapter 404 may be an AC/DC adapter.

The computing device 402 may also include one or more central processing unit(s) (CPUs) 408. In some embodiments, the CPU 408 may be one or more processors in the Pentium® family of processors including the Pentium® II processor family, Pentium® III processors, Pentium® IV , CORE2 Duo processors, or Atom processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 412 may be coupled to, or integrated with, CPU 408. The chipset 412 may include a memory control hub (MCH) 414. The MCH 414 may include a memory controller 416 that is coupled to a main system memory 418. The main system memory 418 stores data and sequences of instructions that are executed by the CPU 408, or any other device included in the system 400. In some embodiments, the main system memory 418 includes random access memory (RAM); however, the main system memory 418 may be implemented using other memory types such as dynamic RAM (DRAM), synchronous DRAM (SDRAM), and the like. Additional devices may also be coupled to the bus 410, such as multiple CPUs and/or multiple system memories.

The MCH 414 may also include a graphics interface 420 coupled to a graphics accelerator 422. In some embodiments, the graphics interface 420 is coupled to the graphics accelerator 422 via an accelerated graphics port (AGP). In some embodiments, a display (such as a flat panel display) 440 may be coupled to the graphics interface 420 through, for example, a signal converter that translates a digital representation of an image stored in a storage device such as video memory or system memory into display signals that are interpreted and displayed by the display. The display 440 signals produced by the display device may pass through various control devices before being interpreted by and subsequently displayed on the display.

A hub interface 424 couples the MCH 414 to an platform control hub (PCH) 426. The PCH 426 provides an interface to input/output (I/O) devices coupled to the computer system 400. The PCH 426 may be coupled to a peripheral component interconnect (PCI) bus. Hence, the PCH 426 includes a PCI bridge 428 that provides an interface to a PCI bus 430. The PCI bridge 428 provides a data path between the CPU 408 and peripheral devices. Additionally, other types of I/O interconnect topologies may be utilized such as the PCI Express™ architecture, available through Intel® Corporation of Santa Clara, Calif.

The PCI bus 430 may be coupled to an audio device 432 and one or more disk drive(s) 434. Other devices may be coupled to the PCI bus 430. In addition, the CPU 408 and the MCH 414 may be combined to form a single chip. Furthermore, the graphics accelerator 422 may be included within the MCH 414 in other embodiments.

Additionally, other peripherals coupled to the PCH 426 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 402 may include volatile and/or nonvolatile memory.

Thus, there is described herein an architecture and associated methods to implement trusted service interaction in electronic devices. In some embodiments the architecture uses hardware capabilities embedded in an electronic device platform to establish a secure communication between a remote service and a trusted execution complex. The execution complex may be implemented in a trusted execution complex which presents a secure dialog box in which at least portions of the secure communication session may be executed. In some embodiments the trusted execution complex may be implemented in a remote device, e.g., a dongle.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A secure controller for an electronic device, comprising:
a computer-readable memory; and
logic, at least partially including hardware logic, configured to:
receive, from an application executing on an untrusted execution complex of the electronic device, a request for a secure communication session with a remote service;
verify a security credential received from the remote service;
establish a secure communication connection between the secure controller and the remote service;
define, on a region of a display device coupled to the controller, a dialog box;
lock the dialog box such that input/output operations conducted in the dialog box are visible only to the controller and are not visible to the untrusted execution complex;
receive a user input from the dialog box, wherein the user input comprises one or more authentication credentials;
forward the one or more authentication credentials to the remote service; and
conduct a secure communication session with the remote service.

2. The secure controller of claim 1, wherein the logic is further configured to:
receive, from the remote service, a security certificate; and
verify the security certificate.

3. The controller of claim 1, wherein the logic is further configured to:
receive, from the remote service, an attestation challenge;
receive, from a user, a response to the attestation challenge; and
forward the response to the remote service via the secure communication connection.

4. The controller of claim 1, wherein:
the request for trusted input from the user is received from an application executing on a processor coupled to the secure controller; and
the request includes an identifier which uniquely identifies the application and the request.

5. The controller of claim 4, wherein the logic is further configured to:
establish a secure channel between the secure controller and the application executing on the processor coupled to the secure controller; and
pass the user input from the secure controller to the application via the secure channel.

6. The controller of claim 5, wherein the logic to establish a secure channel between the secure controller and the application executing on the processor coupled to the secure controller comprises logic to verify the identifier and the request with the application.

7. An electronic device, comprising:
a display;
a processor to implement an untrusted computing environment; and
a controller, comprising:
logic configured to:
receive, from an application executing on an untrusted execution complex of the electronic device, a request for a secure communication session with a remote service;
verify a security credential received from the remote service;
establish a secure communication connection between the secure controller and the remote service;
define, on a region of a display device coupled to the controller, a dialog box;
lock the dialog box such that input/output operations conducted in the dialog box are visible only to the controller and are not visible to the untrusted execution complex;
receive a user input from the dialog box, wherein the user input comprises one or more authentication credentials;
forward the one or more authentication credentials to the remote service; and
conduct a secure communication session with the remote service.

8. The electronic device of claim 7, wherein the logic is further configured to:
receive, from the remote service, a security certificate; and
verify the security certificate.

9. The electronic device of claim 7, wherein the logic is further configured to:
receive, from the remote service, an attestation challenge;
receive, from a user, a response to the attestation challenge; and
forward the response to the remote service via the secure communication connection.

10. The electronic device of claim 7, wherein:
the request for trusted input from the user is received from an application executing on a processor coupled to the secure controller; and
the request includes an identifier which uniquely identifies the application and the request.

11. The electronic device of claim 10, wherein the logic is further configured to:
establish a secure channel between the secure controller and the application executing on the processor coupled to the secure controller; and
pass the user input from the secure controller to the application via the secure channel.

12. The electronic device of claim 11, wherein the logic to establish a secure channel between the secure controller and the application executing on the processor coupled to the secure controller comprises logic to verify the identifier and the request with the application.

13. A computer program product comprising logic instructions stored on a non-transitory computer readable medium which, when executed by a secure controller, configure the secure controller to:
receive, from an application executing on an untrusted execution complex of the electronic device, a request for a secure communication session with a remote service;
verify a security credential received from the remote service;
establish a secure communication connection between the secure controller and the remote service;
define, on a region of a display device coupled to the controller, a dialog box;
lock the dialog box such that input/output operations conducted in the dialog box are visible only to the controller and are not visible to the untrusted execution complex;
receive a user input from the dialog box, wherein the user input comprises one or more authentication credentials;
forward the one or more authentication credentials to the remote service; and
conduct a secure communication session with the remote service.

14. The computer program product of claim 13, further comprising logic instructions stored on a non-transitory computer readable medium which, when executed by a secure controller, configure the secure controller to:
receive, from the remote service, a security certificate; and
verify the security certificate.

15. The computer program product of claim 13, further comprising logic instructions stored on a non-transitory computer readable medium which, when executed by a secure controller, configure the secure controller to:
receive, from the remote service, an attestation challenge;
receive, from a user, a response to the attestation challenge; and
forward the response to the remote service via the secure communication connection.

16. The computer program product of claim 13, wherein:
the request for trusted input from the user is received from an application executing on a processor coupled to the secure controller; and
the request includes an identifier which uniquely identifies the application and the request.

17. The computer program product of claim 11, further comprising logic instructions stored on a non-transitory computer readable medium which, when executed by a secure controller, configure the secure controller to:
establish a secure channel between the secure controller and the application executing on the processor coupled to the secure controller; and
pass the user input from the secure controller to the application via the secure channel.

18. The computer program product of claim 17, further comprising logic instructions stored on a non-transitory computer readable medium which, when executed by a secure controller, configure the secure controller to verify the identifier and the request with the application.

* * * * *